US010313392B2

(12) United States Patent
Yu et al.

(10) Patent No.: US 10,313,392 B2
(45) Date of Patent: Jun. 4, 2019

(54) METHOD AND DEVICE FOR DETECTING WEB ADDRESS HIJACKING

(71) Applicant: Xiaomi Inc., Beijing (CN)

(72) Inventors: Yifei Yu, Beijing (CN); Zhongyi Du, Beijing (CN); Jinglong Zuo, Beijing (CN)

(73) Assignee: Xiaomi Inc., Beijing (CN)

( * ) Notice: Subject to any disclaimer, the term of this patent is extended or adjusted under 35 U.S.C. 154(b) by 275 days.

(21) Appl. No.: 15/185,223

(22) Filed: Jun. 17, 2016

(65) Prior Publication Data

US 2016/0373482 A1 Dec. 22, 2016

(30) Foreign Application Priority Data

Jun. 19, 2015 (CN) .......................... 2015 1 0347804

(51) Int. Cl.
*H04L 29/06* (2006.01)
*G06F 21/12* (2013.01)
(Continued)

(52) U.S. Cl.
CPC ...... *H04L 63/1466* (2013.01); *G06F 17/3053* (2013.01); *G06F 17/3089* (2013.01);
(Continued)

(58) Field of Classification Search
CPC . H04L 63/1466; H04L 63/1441; H04L 67/02; H04L 29/06911; H04L 29/06925; H04L 29/06931; H04L 29/06938; G06F 17/3053; G06F 17/3089; G06F 21/128; G06F 17/30864; G06F 21/55
(Continued)

(56) References Cited

U.S. PATENT DOCUMENTS 7,657,622 B1 * 2/2010 Douglis .............. H04L 41/5003
709/224
8,103,599 B2 * 1/2012 Gao ....................... G06Q 30/02
706/11
(Continued)

FOREIGN PATENT DOCUMENTS

CN 102594934 A 7/2012
CN 102917049 A 2/2013
(Continued)

OTHER PUBLICATIONS

Notification of Reasons for Refusal issued by the Japanese Patent Office dated Aug. 29, 2017, in counterpart Japanese Application No. 2016-525092.
(Continued)

*Primary Examiner* — Shahriar Zarrineh
(74) *Attorney, Agent, or Firm* — Finnegan, Henderson, Farabow, Garrett & Dunner LLP

(57) ABSTRACT

The present disclosure relates to a method and a device for detecting web address hijacking. The method includes: obtaining a currently accessed web address and a target directed web address from a current web address access instruction; determining a secure directed web address from the currently accessed web address according to a history of web address access instructions; and determining whether the target directed web address is hijacked according to the secure directed web address.

12 Claims, 12 Drawing Sheets

(51) Int. Cl.
*G06F 17/30* (2006.01)
*H04L 29/08* (2006.01)

(52) U.S. Cl.
CPC ........ *G06F 21/128* (2013.01); *H04L 63/1416* (2013.01); *H04L 63/1441* (2013.01); *H04L 67/02* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 8,205,258 | B1* | 6/2012 | Chang | G06F 17/30684 709/217 |
| 8,255,386 | B1* | 8/2012 | Annau | G06F 17/3089 707/711 |
| 8,286,239 | B1* | 10/2012 | Sutton | H04L 63/0227 726/22 |
| 8,505,094 | B1* | 8/2013 | Xuewen | H04L 63/1416 707/687 |
| 8,943,588 | B1* | 1/2015 | Speegle | H04L 63/1483 726/22 |
| 8,990,928 | B1 | 3/2015 | Emigh et al. | |
| 8,997,228 | B1 | 3/2015 | Satish et al. | |
| 9,654,504 | B1* | 5/2017 | Vervier | H04L 63/1483 |
| 2002/0161866 | A1* | 10/2002 | Tozer | H04L 29/06 709/220 |
| 2004/0139170 | A1* | 7/2004 | Shen | H04L 12/2856 709/218 |
| 2008/0295153 | A1* | 11/2008 | Cheng | H04L 63/1416 726/3 |
| 2009/0037976 | A1* | 2/2009 | Teo | G06F 21/566 726/1 |
| 2010/0186088 | A1* | 7/2010 | Banerjee | G06F 21/51 726/23 |
| 2011/0185421 | A1* | 7/2011 | Wittenstein | G06F 21/554 726/22 |
| 2011/0191849 | A1 | 8/2011 | Jayaraman et al. | |
| 2012/0102568 | A1* | 4/2012 | Tarbotton | G06F 21/552 726/23 |
| 2012/0158626 | A1 | 6/2012 | Zhu et al. | |
| 2014/0082182 | A1* | 3/2014 | Doan | H04L 51/12 709/224 |
| 2014/0115700 | A1 | 4/2014 | Tang et al. | |
| 2014/0215631 | A1 | 7/2014 | Tao | |
| 2014/0380472 | A1* | 12/2014 | Peterson | H04L 63/1416 726/23 |
| 2015/0271202 | A1* | 9/2015 | Yan | G06F 17/30887 726/23 |
| 2015/0288715 | A1* | 10/2015 | Hotchkiss | H04L 63/0876 726/7 |
| 2016/0080401 | A1* | 3/2016 | Zhou | H04L 63/1416 726/1 |
| 2016/0191522 | A1* | 6/2016 | Liang | H04L 9/32 713/168 |
| 2016/0373482 | A1* | 12/2016 | Yu | H04L 63/1441 |
| 2017/0053037 | A1* | 2/2017 | Luna | G06F 17/30867 |
| 2017/0193386 | A1* | 7/2017 | Qin | G06N 5/02 |
| 2017/0257416 | A1* | 9/2017 | Lv | G06F 17/30876 |

FOREIGN PATENT DOCUMENTS

| | | |
|---|---|---|
| CN | 103780450 A | 5/2014 |
| CN | 103856437 A | 6/2014 |
| JP | 2015-011549 A | 1/2015 |
| RU | 2446459 C1 | 3/2012 |
| RU | 2495486 C1 | 10/2013 |
| WO | WO 2014/059895 A1 | 4/2014 |
| WO | WO 2015/008171 A1 | 1/2015 |

OTHER PUBLICATIONS

Takashi Matsunaka et al., "A Consideration of Detecting Compromised Web Sites by Analyzing Web Link Structures in the framework for combating Drive-by Download attacks," the Institute of Electronics, Information and Communication Engineers, the 31$^{st}$ Symposium on Cryptography and Information Security, Japan, Jan. 21-24, 2014, pp. 1-8.

European Search Report issued by the European Patent Office dated Sep. 28, 2016, in counterpart European Application No. 16175306.6-1870.

International Search Report and Written Opinion issue by the State Intellectual Property Office of the People's Republic of China (SIPO) on Mar. 11, 2016, in counterpart International Application No. PCT/CN2015/095336.

T. Lodderstedt, ED, "RFC 6819 OAuth 2.0 Threat Model and Security Considerations," Internet Engineering Tast Force (IETF), Jan. 2013, pp. 1-71.

\* cited by examiner

METHOD AND DEVICE FOR DETECTING WEB ADDRESS HIJACKING

CROSS-REFERENCE TO RELATED APPLICATION

This application is based on and claims priority to Chinese Patent Application Serial No. CN 201510347804.3, filed with the State Intellectual Property Office of P. R. China on Jun. 19, 2015, the entire content of which is incorporated herein by reference.

FIELD

The present disclosure relates to the field of network security technology and, more particularly, to a method and a device for detecting web address hijacking.

BACKGROUND

In related art, a network operator may monitor a request of a user at an intermediate router when the user uses a device to access a website through a network, and return a direct response before a target server returns a response when certain conditions are satisfied, such that the user is directed to a web address having an interest related to the network operator. That is known as web address hijacking. The web address corresponding to the direct response (hereinafter referred to as the "directed web address") may correspond to a phishing website, or may contain Trojans and pop-up advertisements, which affect user experience. If the user requests a partner web address of a browser, the directed web address may harm legitimate interest of the browser.

SUMMARY

Embodiments of the present disclosure provide a method and a device for detecting web address hijacking, which include following technical solutions.

According to a first aspect of the present disclosure, a method for detecting web address hijacking is provided. The method includes: obtaining a currently accessed web address and a target directed web address from a current web address access instruction; determining a secure directed web address from the currently accessed web address according to a history of web address access instructions; and determining whether the target directed web address is hijacked according to the secure directed web address.

According to a second aspect of the present disclosure, a device for detecting web address hijacking is provided. The device includes: a processor; and a memory configured to store instructions executable by the processor. The processor is configured to: obtain a currently accessed web address and a target directed web address from a current web address access instruction; determine a secure directed web address from the currently accessed web address according to a history of web address access instructions; and determine whether the target directed web address is hijacked according to the secure directed web address.

It should be understood that, the above general description and following detail description are exemplary and explanatory, and shall not be construed to limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
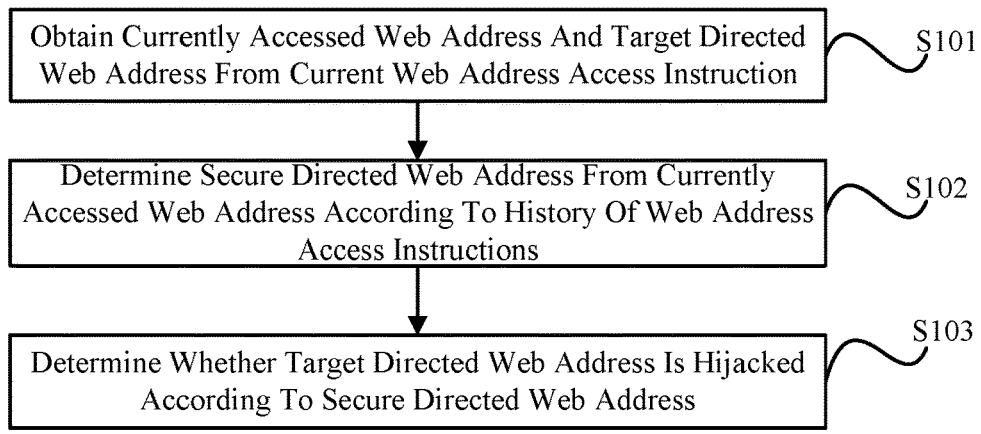
FIG. 1 is a flow chart of a method for detecting web address hijacking according to an exemplary embodiment of the present disclosure.

Embodiments of the present disclosure provide a method for detecting web address hijacking, which may be applied in terminal equipment, for example, terminal equipment having a web address access function, such as a mobile phone, a computer, a digital broadcasting terminal, a message transceiver, a game console, a tablet device, a medical equipment, a fitness equipment and a personal digital assistant. As shown in FIG. 1, the method includes steps S101-S103.

In step S101, a currently accessed web address and a target directed web address are obtained from a current web address access instruction.

In step S102, a secure directed web address is determined from the currently accessed web address according to a history of web address access instructions.

In an embodiment, the history of web address access instructions includes a plurality of historical web address access instructions, and each historical web address access instruction includes an access web address, whether including a direct, a directed web address, and an access time.

In step S103, it is determined whether the target directed web address is hijacked according to the secure directed web address.

In this embodiment, the secure directed web address is determined according to the historical web address access instructions in the history of web address access instructions, such that whether the target directed web address is hijacked is determined according to the secure directed web address. In this way, abnormal direct may be detected immediately, and hijackings may be found without maintaining and issuing blacklisted web addresses in advance, thus enhancing a recognition rate of hijacked web addresses, and reducing a cost.

Figure 2:
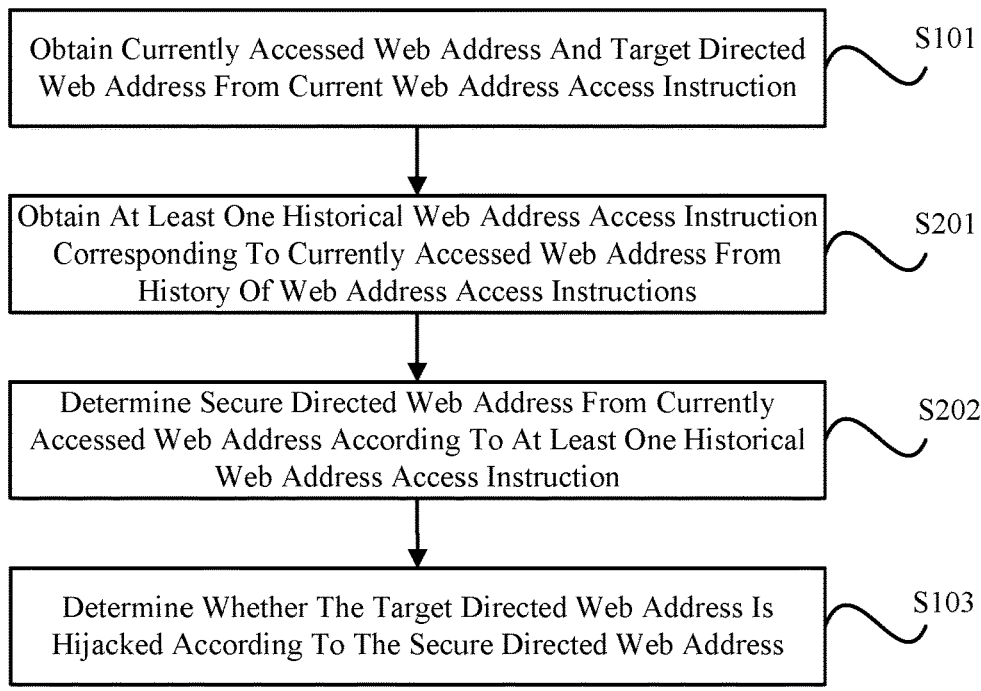
FIG. 2 is a flow chart of a method for detecting web address hijacking according to an exemplary embodiment of the present disclosure.

As shown in FIG. 2, in an embodiment, the above step S102 includes steps S201-S202.

In step S201, at least one historical web address access instruction corresponding to the currently accessed web address is obtained from the history of web address access instructions. The at least one historical web address access instruction corresponding to the currently accessed web address may include a historical web address access instruction in the history of web address access instructions whose access web address is the currently accessed web address, or whose directed web address is the target directed web address.

In step S202, the secure directed web address from the currently accessed web address is determined according to the at least one historical web address access instruction.

In this embodiment, the secure directed web address is determined according to the at least one historical web address access instruction corresponding to the currently accessed web address, such that whether the target directed web address is hijacked is determined according to the secure directed web address. In this way, abnormal directs may be detected immediately, and hijackings may be found without maintaining and issuing blacklisted web addresses in advance, thus enhancing the recognition rate of hijacked web addresses, and reducing the cost.

Figure 3:
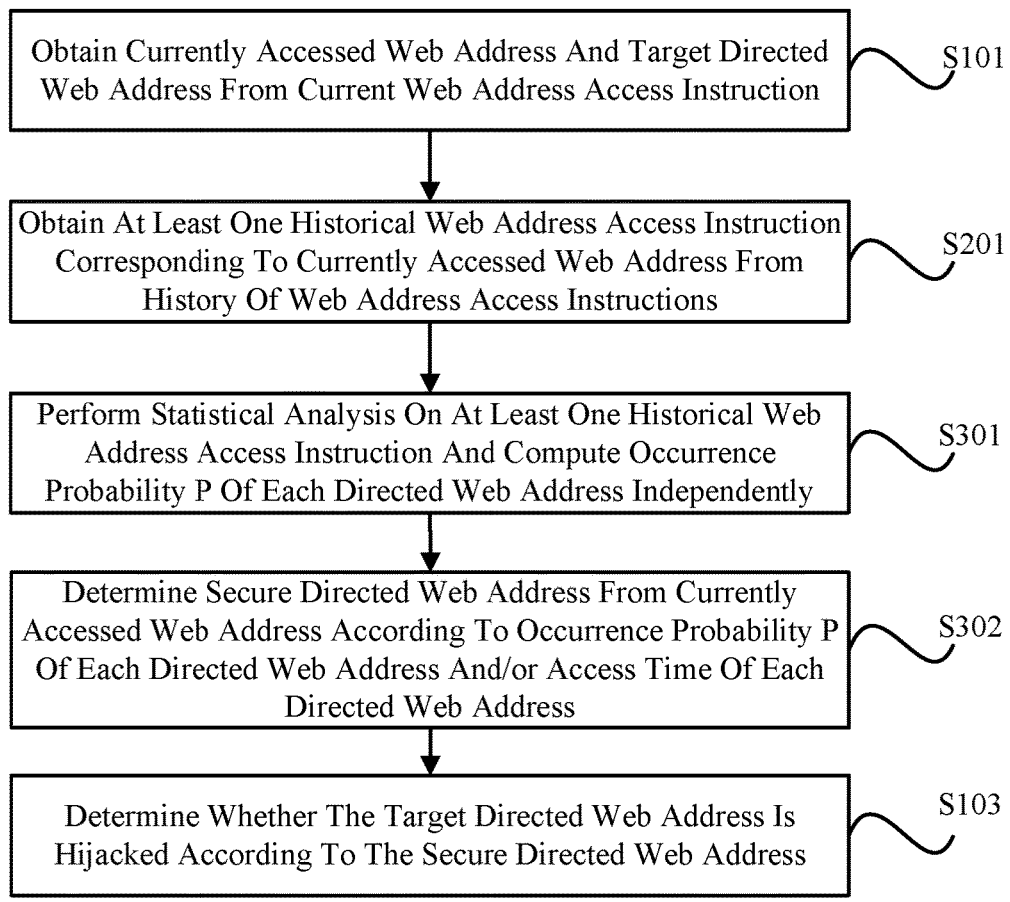
FIG. 3 is a flow chart of a step in a method for detecting web address hijacking according to an exemplary embodiment of the present disclosure.

As shown in FIG. 3, in an embodiment, the above step S202 includes steps S301-S302.

In step S301, a statistical analysis is performed on the at least one historical web address access instruction, and an occurrence probability P of each directed web address in the at least one historical web address access instruction is computed independently. Assuming that the probability corresponding to all of the directed web addresses in the obtained at least one historical web address access instruction is 1, a probability of each directed web address relative to all of the directed web addresses may be computed, to determine the secure directed web address.

In step S302, the secure directed web address is determined from the currently accessed web address according to the occurrence probability P of each directed web address and/or the access time of each directed web address.

In this embodiment, the secure directed web address is determined according to the occurrence probability of the directed web address, the access time, or both of them, such that the determined secure directed web address may be more accurate, thus further ensuring the security of web address directing, enhancing the recognition rate of hijacked web addresses, and reducing the cost.

The above step S302 may be implemented in following ways.

First Way

Figure 4:
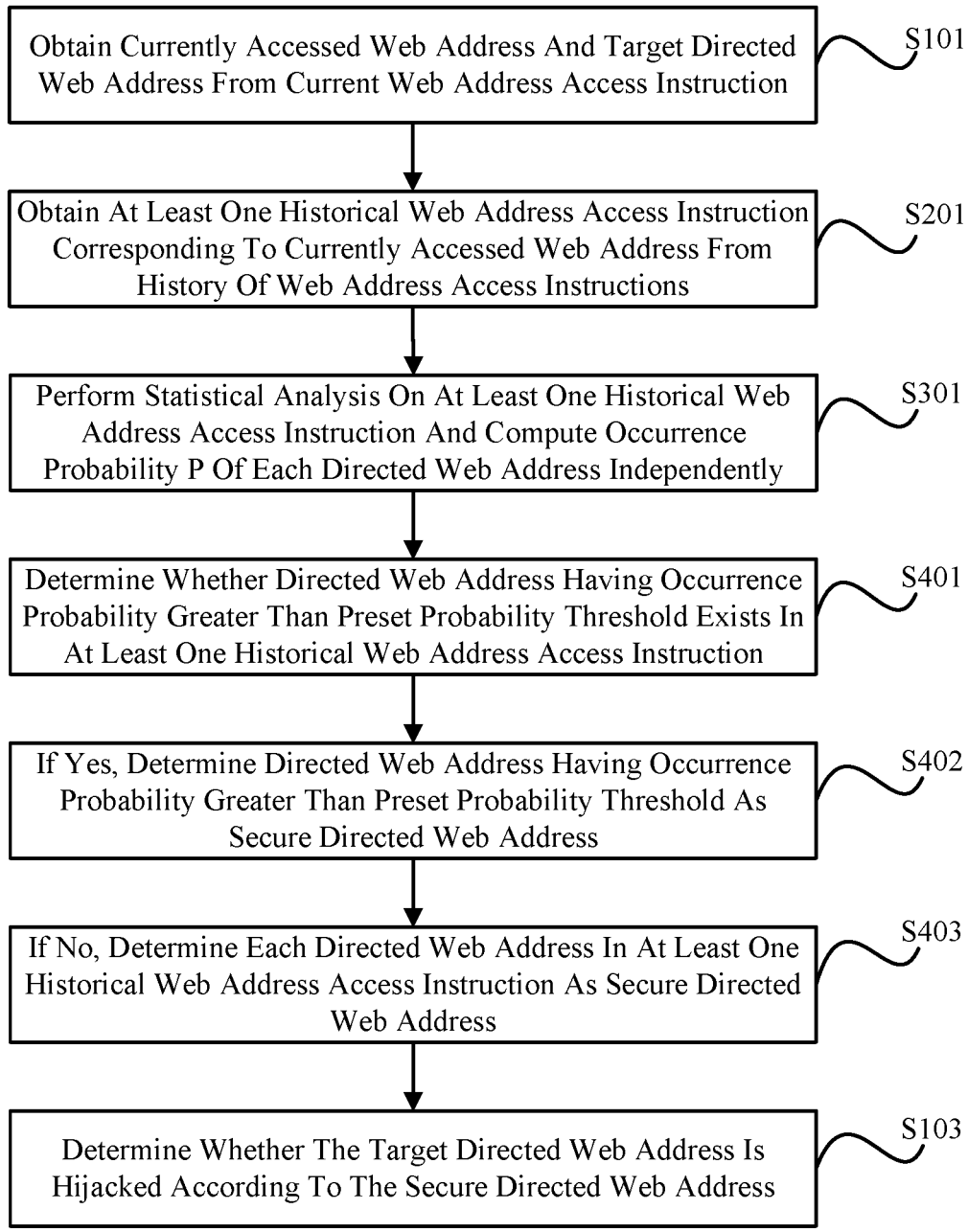
FIG. 4 is a flow chart of a step in a method for detecting web address hijacking according to an exemplary embodiment of the present disclosure.

As shown in FIG. 4, in an embodiment, the above step S302 includes steps S401-S403.

In step S401, it is determined whether a directed web address having the occurrence probability greater than a preset probability threshold exists in the at least one historical web address access instruction.

In step S402, if the determining result is positive, the directed web address having the occurrence probability greater than the preset probability threshold is determined as the secure directed web address.

In step S403, if the determining result is negative, each directed web address in the at least one historical web address access instruction is determined as the secure directed web address.

In this embodiment, if the at least one historical web address access instruction contains directed web addresses each having the occurrence probability greater than the preset probability threshold, these directed web addresses are determined as the secure directed web addresses, thus ensuring the accuracy of the secure directed web addresses. Moreover, if the at least one historical web address access instruction does not contain a directed web address having the occurrence probability greater than the preset probability threshold, it indicates that a probability distribution of the historical web address access instructions is dispersive, and thus all of the directed web addresses in the at least one historical web address access instruction may be temporally regards as secure. In this way, the determined secure directed web address may be more accurate, thus further ensuring the security of web address directing, enhancing the recognition rate of hijacked web addresses, and reducing the cost.

For example, there are ten historical web address access instructions corresponding to the currently accessed web address, and the preset probability threshold is 0.5. If there are two different directed web addresses in these ten historical web address access instructions (one is directed web address 1, and the other one is directed web address 2), the occurrence probability of directed web address 1 being 0.6, and the occurrence probability of directed web address 2 being 0.4, then directed web address 1 may be determined as the secure directed web address, since the occurrence probability 0.6 of directed web address 1 is greater than the preset probability threshold 0.5. If there are four different directed web addresses (directed web address 1, directed web address 2, directed web address 3, and directed web address 4) in these ten historical web address access instructions, the probability of directed web address 1 being 0.2, the probability of directed web address 2 being 0.3, the probability of directed web address 3 being 0.2, and the probability of directed web address 4 being 0.3, then each of these four directed web addresses may be determined as the secure directed web address, since the probability of each directed web address is less than the preset probability threshold 0.5.

Second Way

Figure 5:
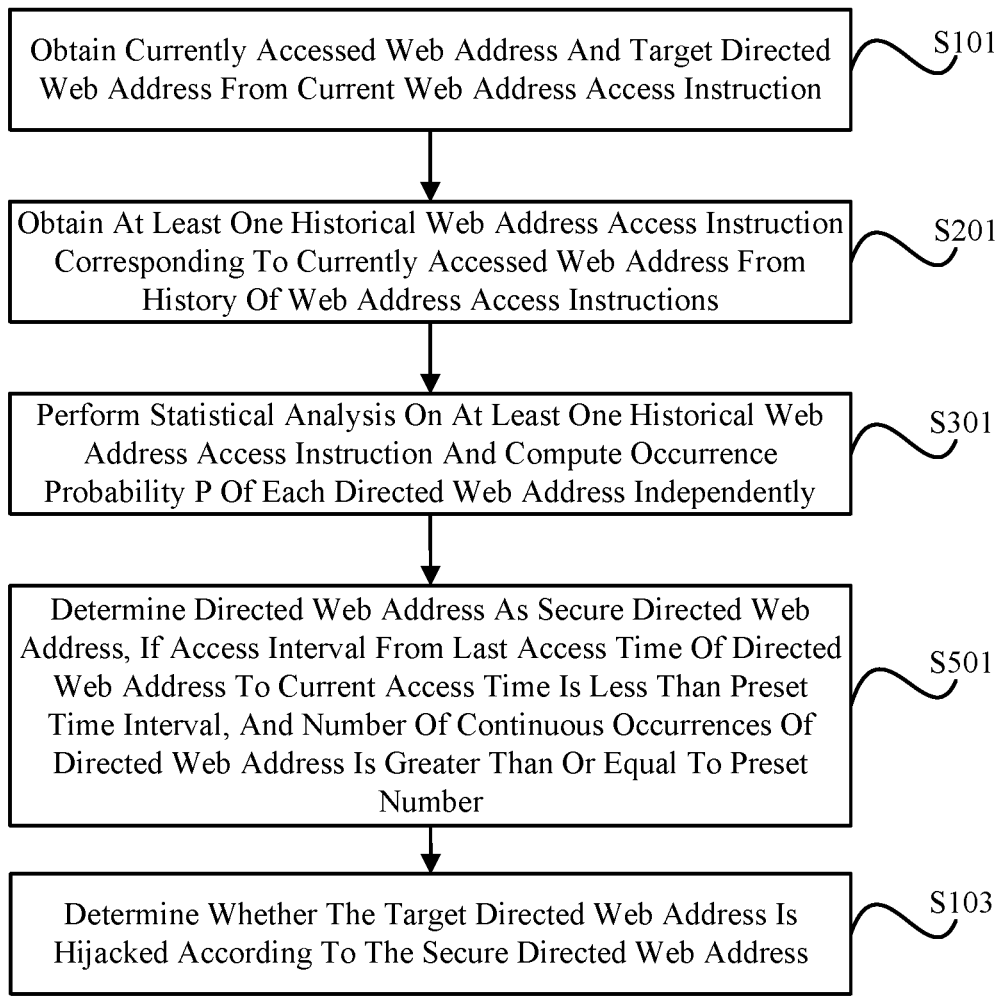
FIG. 5 is a flow chart of a step in a method for detecting web address hijacking according to an exemplary embodiment of the present disclosure.

As shown in FIG. 5, in an embodiment, the above step S302 further includes step S501.

In step S501, a directed web address is determined as the secure directed web address, if an access interval from a last access time of the directed web address to a current access time of the currently accessed web address is less than a preset time interval, and a number of continuous occurrences of the directed web address is greater than or equal to a preset number.

In this embodiment, if the number of continuous occurrences of the directed web address is greater than or equal to the preset number, and the access interval from the last access time of the directed web address to the current access time is less than the preset time interval, then the directed web address may be regarded as secure.

For example, the preset number is 2, and the preset time interval is one day. If the access time of the last access to the directed web address is less than one day apart from the current access time, and the directed web address appears three times continuously, then the directed web address may be regarded as secure.

Third Way

Figure 6:
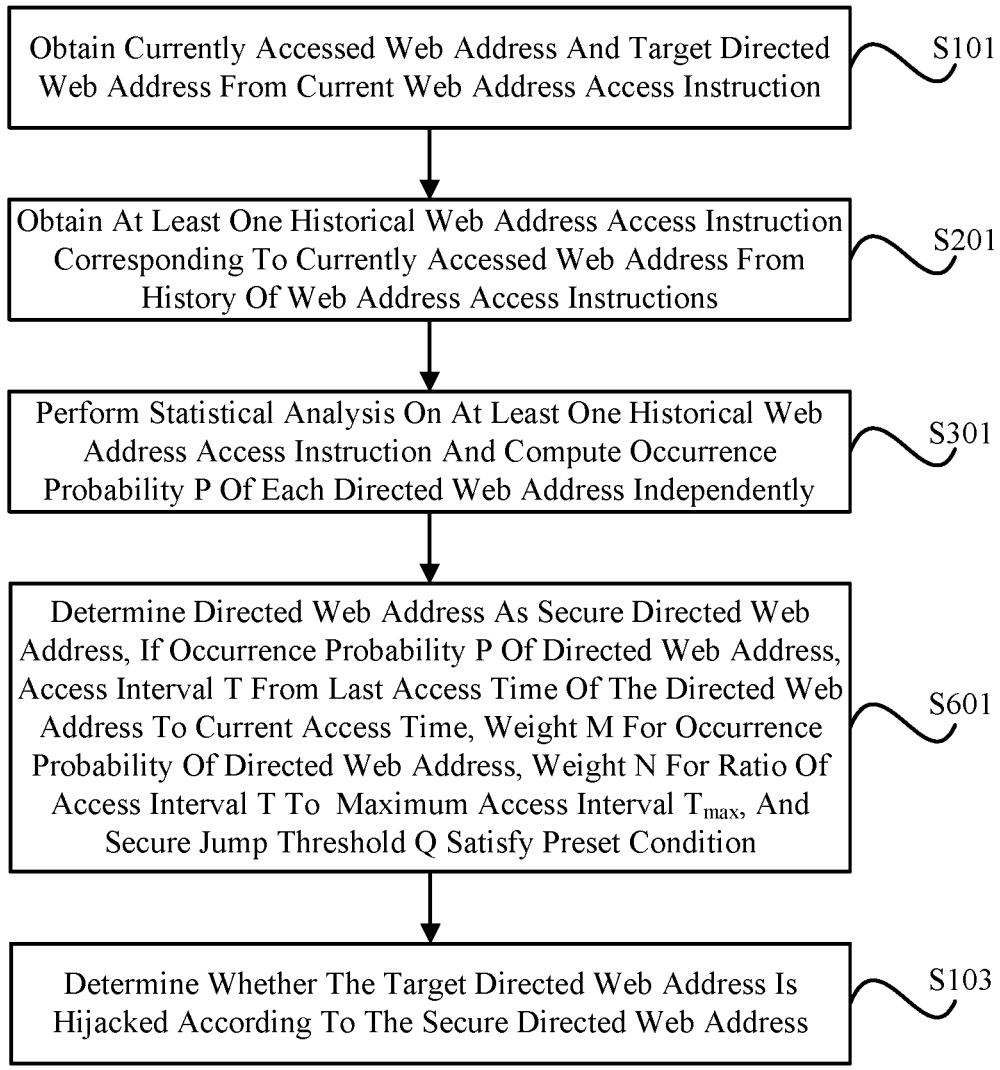
FIG. 6 is a flow chart of a step in a method for detecting web address hijacking according to an exemplary embodiment of the present disclosure.

As shown in FIG. 6, in an embodiment, the above step S302 further includes step S601.

In step S601, a directed web address is determined as the secure directed web address, if an occurrence probability P of the directed web address, an access interval T from a last access time of the directed web address to a current access time, a weight M for the occurrence probability P of the directed web address, a weight N for a ratio of the access interval T to a maximum access interval $T_{max}$, and a secure direct threshold Q satisfy a preset condition, which is a formula of $$P*M + \left(1 - \frac{T}{T_{max}}\right)*N \geq Q.$$

For example, if the secure direct threshold Q is 0.5, the occurrence probability P of a directed web address is 0.4, the weight M is 0.6, T is 12 hours, $T_{max}$ is 24 hours, the weight N is 0.4, then according to the above formula, 0.5*0.6+(1−12/24)*0.4=0.5, and thus the directed web address may be regarded as the secure directed web address. The larger the occurrence probability of the directed web address is, and the less the access interval is, the more likely the directed web address is determined as the secure directed web address. On the contrary, the smaller the occurrence probability of the directed web address is, and the larger the access interval is, the less likely the directed web address is determined as the secure directed web address.

In this embodiment, the secure directed web address may be determined according to both the occurrence probability of the directed web address and the access time, such that the determined secure directed web address may be more accurate, thus further ensuring the security of web address directing, enhancing the recognition rate of hijacked web addresses, and reducing the cost.

Figure 7:
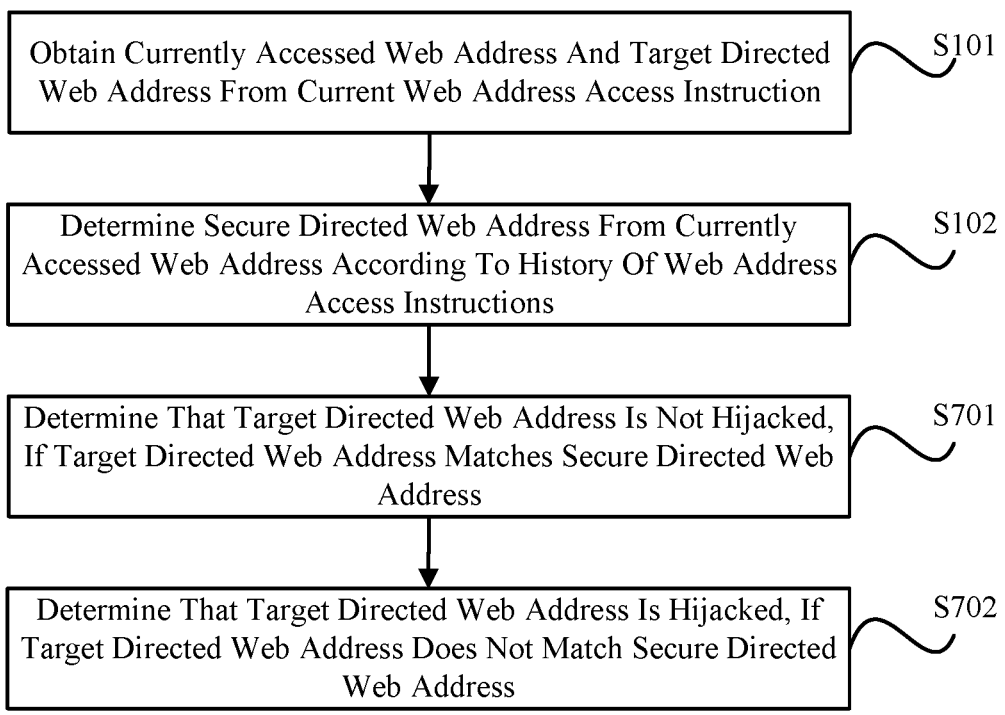
FIG. 7 is a flow chart of a step in a method for detecting web address hijacking according to an exemplary embodiment of the present disclosure.

As shown in FIG. 7, in an embodiment, the above step S103 includes steps S701-S702.

In step S701, if the target directed web address matches the secure directed web address, it is determined that the target directed web address is not hijacked.

In step S702, if the target directed web address does not match the secure directed web address, it is determined that the target directed web address is hijacked.

In this embodiment, the secure directed web address is determined according to historical web address access instructions, such that whether the target directed web address is hijacked is determined according to the secure directed web address. In this way, abnormal directs may be detected immediately, and hijackings may be found without maintaining and issuing blacklisted web addresses in advance, thus enhancing the recognition rate of hijacked web addresses, and reducing the cost.

Figure 8:
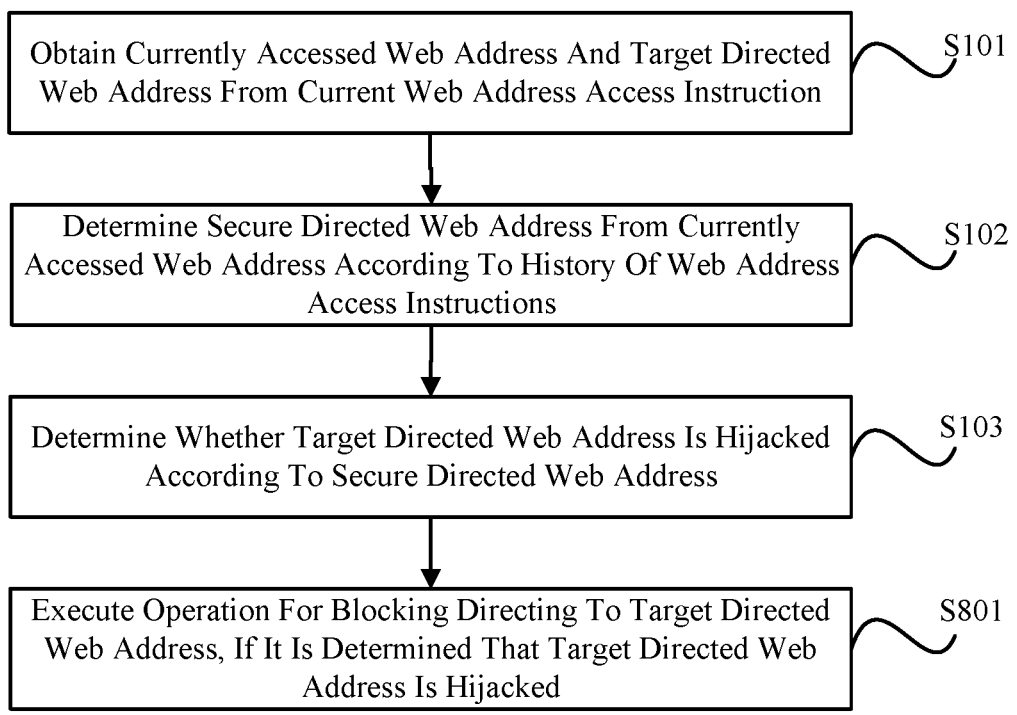
FIG. 8 is a flow chart of a method for detecting web address hijacking according to an exemplary embodiment of the present disclosure.

As shown in FIG. 8, in an embodiment, after step S103, the method further includes step S801.

In step S801, if it is determined that the target directed web address is hijacked, an operation for blocking directing to the target directed web address is executed. The operation for blocking directing to the target directed web address may include one or more of outputting a warning message for prompting the user, switching to hasps, and using a proxy server. Other operations which block directing to the target directed web address may also be performed. In this way, it may ensure the security of the network, and avoid directing to insecure websites, such as phishing websites, which brings a network security risk to the user.

Figure 9:
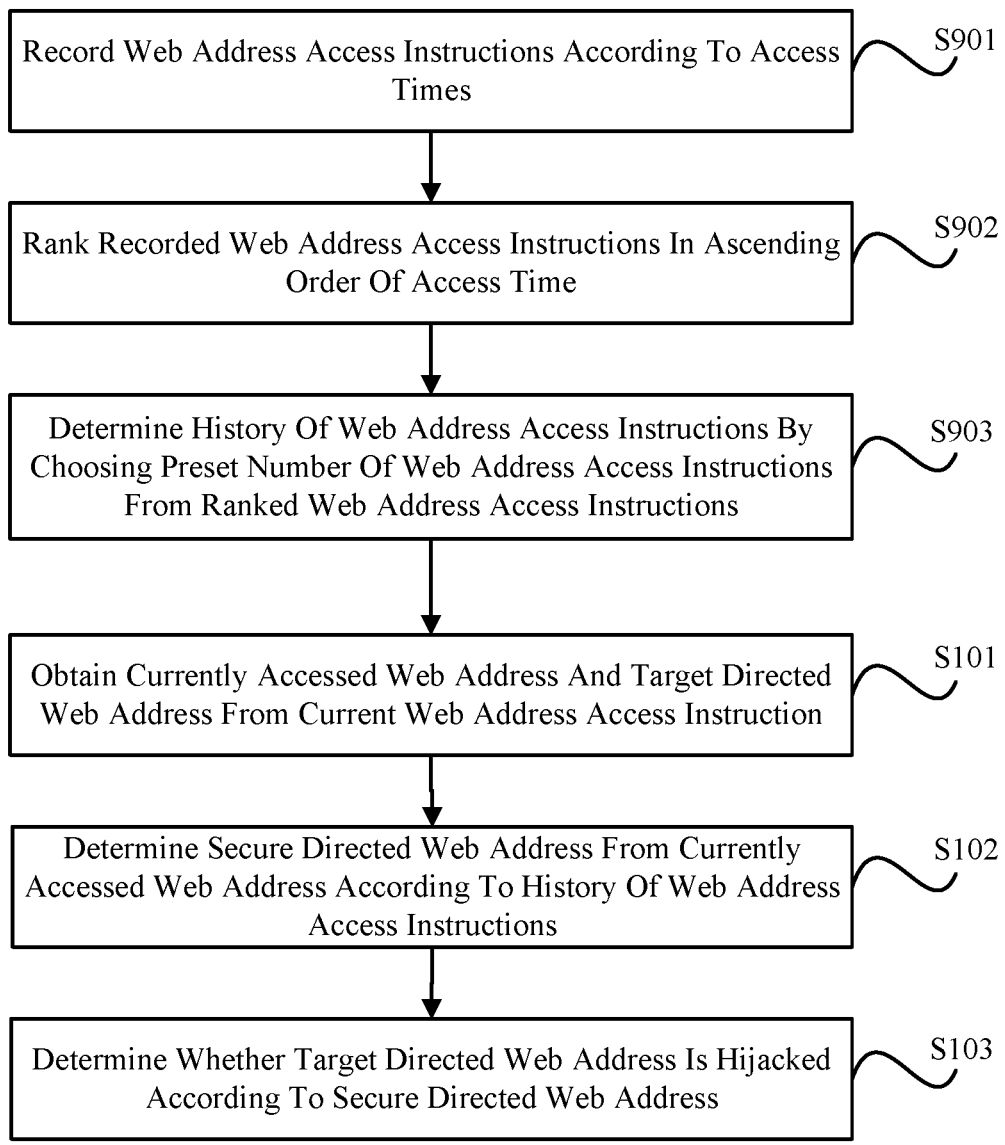
FIG. 9 is a flow chart of a method for detecting web address hijacking according to an exemplary embodiment of the present disclosure.

As shown in FIG. 9, in an embodiment, before step S101, the above method further includes steps S901-S903.

In step S901, web address access instructions are recorded according to access times of access web addresses in the web address access instructions.

In step S902, the recorded web address access instructions are ranked in an ascending order of access time.

In step S903, the history of web address access instructions is determined by choosing a preset number of web address access instructions from the ranked web address access instructions, in which each chosen web address access instruction has the access time before the current access time, or in which an access interval from the access time of the access web address in each chosen web address access instruction to the current access time is less than or equal to a preset time period.

The preset number of web address access instructions before the current access time may be a preset number of continuous web address access instructions before the current access time, or a preset number of discontinuous web address access instructions before the current access time.

In this embodiment, web address access instructions satisfying the access time requirement or the preset number of web address access instructions are chosen from all of the recorded web address access instructions as the history of web address access instructions, and then historical web address access instructions corresponding to the currently accessed web address are obtained from the history of web address access instructions, such that the history of web address access instructions will be updated as the current access time changes, and thus the secure directed web address will be corrected, which ensures the determined secure directed web address more accurate, i.e., ensures determining the hijacked web address more accurately. Moreover, the user does not need to maintain and update the network backlist in real time, thus reducing the operation of the user, and enhancing the user experience.

In the following, device embodiments of the present disclosure are described, which may be used to execute the method embodiments of the present disclosure.

Figure 10:
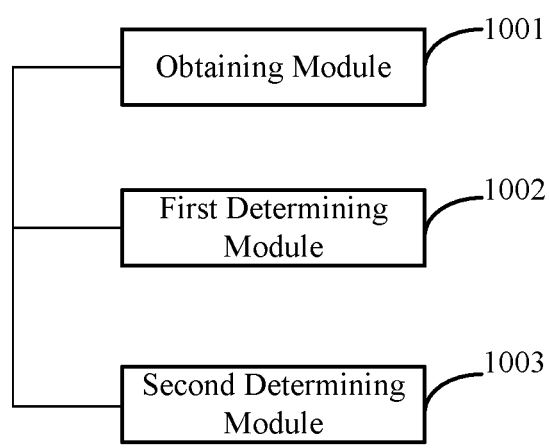
FIG. 10 is a block diagram of a device for detecting web address hijacking according to an exemplary embodiment of the present disclosure.

FIG. 10 is a block diagram of a device for detecting web address hijacking according to an exemplary embodiment of the present disclosure, which may be implemented as a part of an electronic device or as a whole electronic device via software, hardware or a combination thereof. As shown in FIG. 10, the device for detecting web address hijacking includes an obtaining module 1001, a first determining module 1002, and a second determining module 1003.

The obtaining module 1001 is configured to obtain a currently accessed web address and a target directed web address from a current web address access instruction.

The first determining module 1002 is configured to determine a secure directed web address from the currently accessed web address according to a history of web address access instructions. In an embodiment, the history of web address access instructions includes a plurality of historical web address access instructions, and each historical web address access instruction includes an access web address, whether including a direct, a directed web address, and an access time.

The second determining module 1003 is configured to determine whether the target directed web address is hijacked according to the secure directed web address.

In this embodiment, the secure directed web address is determined according to the historical web address access instructions, such that whether the target directed web address is hijacked is determined according to the secure directed web address. In this way, abnormal direct may be detected immediately, and hijackings may be found without maintaining and issuing blacklisted web addresses in advance, thus enhancing a recognition rate of hijacked web addresses, and reducing a cost.

Figure 11:
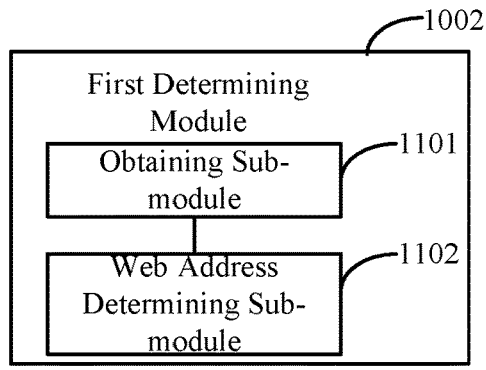
FIG. 11 is a block diagram of a first determining module in a device for detecting web address hijacking according to an exemplary embodiment of the present disclosure.

As shown in FIG. 11, in an embodiment, the first determining module 1002 includes an obtaining sub-module 1101 and a web address determining sub-module 1102.

The obtaining sub-module 1101 is configured to obtain at least one historical web address access instruction corresponding to the currently accessed web address from the history of web address access instructions.

The web address determining sub-module 1102 is configured to determine the secure directed web address from the currently accessed web address according to the at least one historical web address access instruction.

In this embodiment, the secure directed web address is determined according to the historical web address access instruction corresponding to the currently accessed web address, such that whether the target directed web address is hijacked is determined according to the secure directed web address. In this way, abnormal directs may be detected immediately, and hijackings may be found without maintaining and issuing blacklisted web addresses in advance, thus enhancing the recognition rate of hijacked web addresses, and reducing the cost.

In an embodiment, the web address determining sub-module 1102 is configured to: perform a statistical analysis on the at least one historical web address access instruction, compute an occurrence probability of each directed web address in the at least one historical web address access instruction independently, and determine the secure directed web address from the currently accessed web address according to the occurrence probability P of each directed web address and/or the access time of each directed web address.

In this embodiment, the secure directed web address is determined according to the occurrence probability of the directed web address, the access time, or both of them, such that the determined secure directed web address may be more accurate, thus further ensuring the security of web address directing, enhancing the recognition rate of hijacked web addresses, and reducing the cost.

In an embodiment, the web address determining sub-module 1102 is further configured to: determine whether a directed web address having the occurrence probability greater than a preset probability threshold exists in the at least one historical web address access instruction; if a directed web address having the occurrence probability greater than the preset probability threshold exists in the at least one historical web address access instruction, determine the directed web address having the occurrence probability greater than the preset probability threshold as the secure directed web address; and if no directed web address having the occurrence probability greater than the preset probability threshold exists in the at least one historical web address access instruction, determine each directed web address in the at least one historical web address access instruction as the secure directed web address.

In this embodiment, if the at least historical web address access instruction contains directed web addresses each having the occurrence probability greater than the preset probability threshold, these directed web addresses are determined as the secure directed web addresses, thus ensuring the accuracy of the secure directed web addresses. Moreover, if the at least one historical web address access instruction does not contain a directed web address having the occurrence probability greater than the preset probability threshold, it indicates that a probability distribution of the historical web address access instructions is dispersive, and thus all of the directed web addresses in the at least historical web address access instruction may be temporally regards as secure. In this way, the determined secure directed web address may be more accurate, thus further ensuring the security of web address directing, enhancing the recognition rate of hijacked web addresses, and reducing the cost.

For example, there are ten historical web address access instructions corresponding to the currently accessed web address, and the preset probability threshold is 0.5. If there are two different directed web addresses in these ten historical web address access instructions (one is directed web address 1, and the other one is directed web address 2), the occurrence probability of directed web address 1 being 0.6, and the occurrence probability of directed web address 2 being 0.4, then directed web address 1 may be determined as the secure directed web address, since the occurrence probability 0.6 of directed web address 1 is greater than the preset probability threshold 0.5. If there are four different directed web addresses (directed web address 1, directed web address 2, directed web address 3, and directed web address 4) in these ten historical web address access instructions, the probability of directed web address 1 being 0.2, the probability of directed web address 2 being 0.3, the probability of directed web address 3 being 0.2, and the probability of directed web address 4 being 0.3, then each of these four directed web addresses may be determined as the secure directed web address, since the probability of each directed web address is less than the preset probability threshold 0.5.

In an embodiment, the web address determining sub-module 1102 is further configured to determine a directed web address as the secure directed web address, if an access interval from a last access time of the directed web address to a current access time of the currently accessed web address is less than a preset time interval, and a number of continuous occurrences of the directed web address is greater than or equal to a preset number.

In this embodiment, if the number of continuous occurrences of the directed web address is greater than or equal to the preset number, and the access interval between the last access time the directed web address and the current access time is less than the preset time interval, and then the directed web address may be regarded as secure.

For example, the preset number is 2, and the preset time interval is one day. If the last access time of the directed web address is less than one day apart from the current access time, and the directed web address appears three times continuously, then the directed web address may be regarded as secure.

In an embodiment, the web address determining submodule 1102 is further configured to determine a directed web address as the secure directed web address, if the occurrence probability P of the directed web address, an access interval T between a last access time of the directed web address and a current access time, a weight M for the occurrence probability P of the directed web address, a weight N for a ratio of the access interval T to a maximum access interval $T_{max}$ and a secure direct threshold Q satisfy a formula of $$P*M + \left(1 - \frac{T}{T_{max}}\right)*N \geq Q.$$

For example, if the secure direct threshold Q is 0.5, the occurrence probability P of a directed web address is 0.4, the weight M is 0.6, T is 12 hours, $T_{max}$ is 24 hours, the weight N is 0.4, then according to the above formula, 0.5*0.6+(1−12/24)*0.4=0.5, and thus the directed web address may be regarded as the secure directed web address. The larger the occurrence probability of the directed web address is, and the less the access interval is, the more likely the directed web address is determined as the secure directed web address. On the contrary, the smaller the occurrence probability of the directed web address is, and the larger the access interval is, the less likely the directed web address is determined as the secure directed web address.

In this embodiment, the secure directed web address may be determined according to both the occurrence probability of the directed web address and the access time, such that the determined secure directed web address may be more accurate, thus further ensuring the security of web address directing, enhancing the recognition rate of hijacked web addresses, and reducing the cost.

Figure 12:
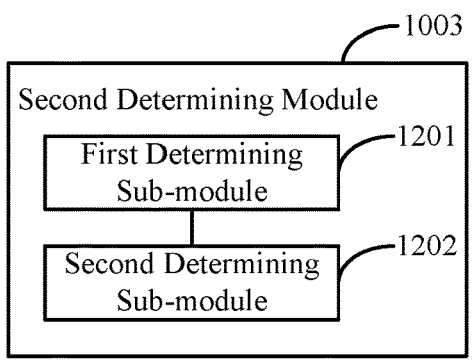
FIG. 12 is a block diagram of a second determining module in a device for detecting web address hijacking according to an exemplary embodiment of the present disclosure.

As shown in FIG. 12, in an embodiment, the above second determining module 1003 includes a first determining sub-module 1201 and a second determining sub-module 1202.

The first determining sub-module 1201 is configured to determine that the target directed web address is not hijacked, if the target directed web address matches the secure directed web address.

The second determining sub-module 1202 is configured to determine that the target directed web address is hijacked, if the target directed web address does not match the secure directed web address.

In this embodiment, the secure directed web address is determined according to historical web address access instructions, such that whether the target directed web address is hijacked is determined according to the secure directed web address. In this way, abnormal directs may be detected immediately, and hijackings may be found without maintaining and issuing blacklisted web addresses in advance, thus enhancing the recognition rate of hijacked web addresses, and reducing the cost.

Figure 13:
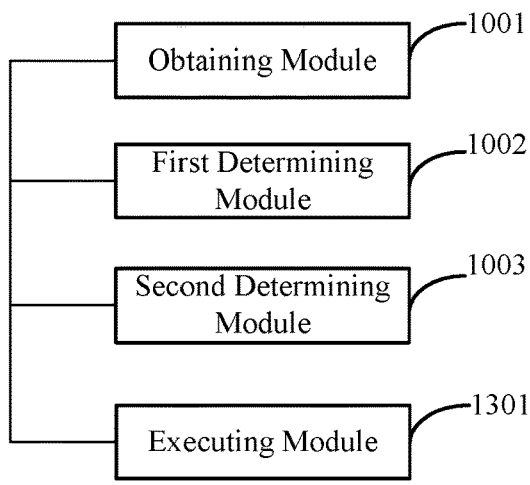
FIG. 13 is a block diagram of a device for detecting web address hijacking according to an exemplary embodiment of the present disclosure.

As shown in FIG. 13, in an embodiment, the above device further includes an executing module 1301.

The executing module 1301 is configured to execute an operation for blocking directing to the target directed web address, if it is determined that the target directed web address is hijacked.

The operation for blocking directing to the target directed web address may include one or more of outputting a warning message for prompting the user, switching to https, and using a proxy server. Other operations which block directing to the target directed web address may also be performed. In this way, it may ensure the security of the network, and avoid directing to insecure websites, such as phishing websites, which brings a network security risk to the user.

Figure 14:
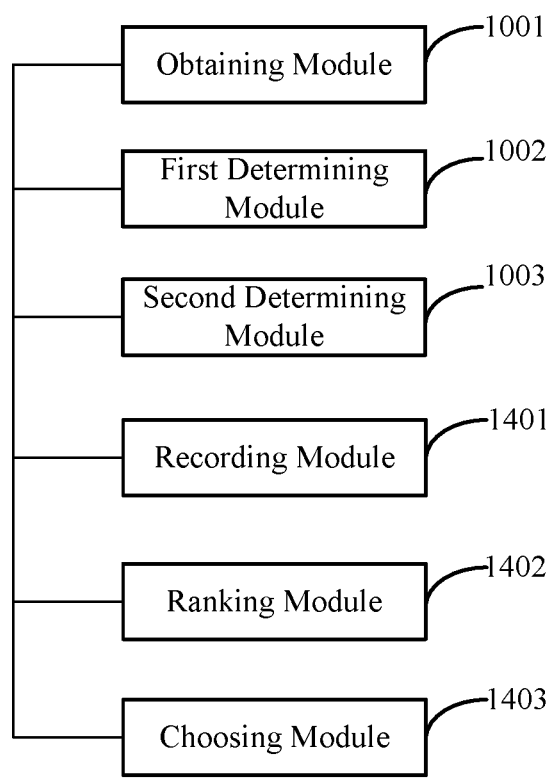
FIG. 14 is a block diagram of a device for detecting web address hijacking according to an exemplary embodiment of the present disclosure.

As shown in FIG. 14, in an embodiment, the above device further includes a recording module 1401, a ranking module 1402, and a choosing module 1403.

The recording module 1401 is configured to record web address access instructions according to access times of access web addresses in the web address access instructions.

The ranking module 1402 is configured to rank the recorded web address access instructions in an ascending order of access time.

The choosing module 1403 is configured to determine the history of web address access instructions by choosing a preset number of web address access instructions from the ranked web address access instructions, in which each chosen web address access instruction has the access time before the current access time, or in which an access interval between the access time of each chosen web address access instruction and the current access time is less than or equal to a preset time period.

The preset number of web address access instructions before the current access time may be a preset number of continuous web address access instructions before the current access time, or a preset number of discontinuous web address access instructions before the current access time.

In this embodiment, web address access instructions satisfying the access time requirement or the preset number of web address access instructions or are chosen from all of the web address access instructions as the history of web address access instructions, and then historical web address access instructions corresponding to the currently accessed web address are obtained from the history of web address access instructions, such that the history of web address access instructions will be updated as the current access time changes, and thus the secure directed web address will be corrected, which ensures the determined secure directed web address more accurate, i.e., ensures determining the hijacked web address more accurately. Moreover, the user does not need to maintain and update the network backlist in real time, thus reducing the operation of the user, and enhancing the user experience.

Figure 15:
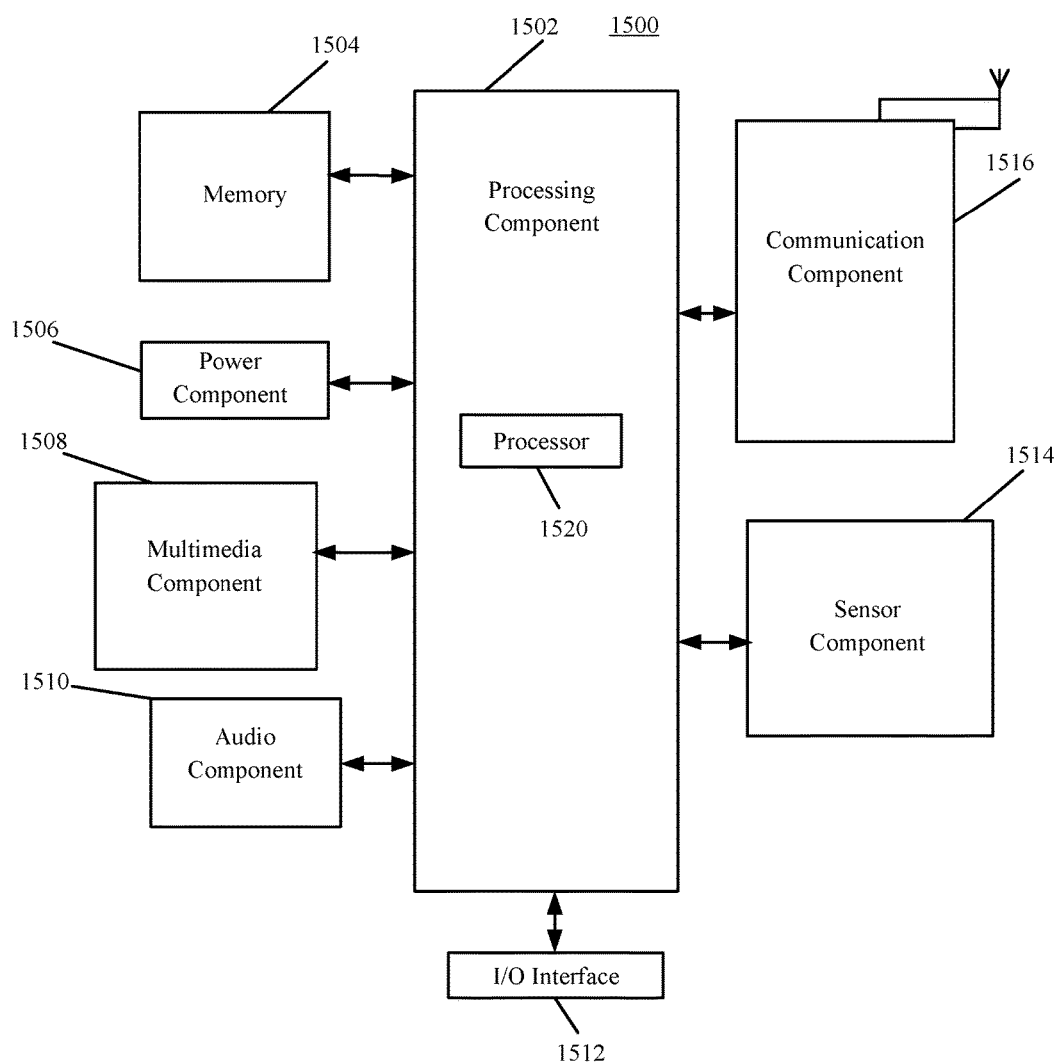
FIG. 15 is a schematic diagram of a device applicable for detecting web address hijacking according to an exemplary embodiment of the present disclosure.

FIG. 15 is a schematic diagram of a device 1500 for detecting web address hijacking according to an exemplary embodiment, which is applied in terminal equipment. For example, the device 1500 may be a mobile phone, a computer, a digital broadcasting terminal, a messaging device, a game console, a tablet device, medical equipment, fitness equipment, a Personal Digital Assistant PDA, etc.

Referring to FIG. 15, the device 1500 may include one or more of the following components: a processing component 1502, a memory 1504, a power component 1506, a multimedia component 1508, an audio component 1510, an Input/Output (I/O) interface 1512, a sensor component 1514, and a communication component 1516.

The processing component 1502 typically controls overall operations of the device 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the device 1500. Examples of such data include instructions for any applications or methods operated on the device 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the device 1500. The power component 1506 may include a power management system, one or more power sources, and any other components associated with the generation, management, and distribution of power in the device 1500.

The multimedia component 1508 includes a screen providing an output interface between the device 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 1508 includes a front camera and/or a rear camera. The front camera and the rear camera may receive external multimedia data while the device 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone configured to receive an external audio signal when the device 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface for the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the device 1500. For instance, the sensor component 1514 may detect an open/closed status of the device 1500 and relative positioning of components (e.g. the display and the keypad of the device 1500). The sensor component 1514 may also detect a change in position of the device 1500 or of a component in the device 1500, a presence or absence of user contact with the device 1500, an orientation or an acceleration/deceleration of the device 1500, and a change in temperature of the device 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate wired or wireless communication between the device 1500 and other devices. The device 1500 can access a wireless network based on a communication standard, such as WIFI, 2G, or 3G, or a combination thereof. In one exemplary embodiment, the communication component 1516 receives a broadcast signal or broadcast associated information from an external broadcast management system via a broadcast channel. In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1504, executable by the processor 1520 in the device 1500, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and comprising such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for detecting web address hijacking, comprising:
    obtaining a currently accessed web address and a target directed web address from a current web address access instruction;
    determining a secure directed web address from the currently accessed web address according to a history of web address access instructions; and
    determining whether the target directed web address is hijacked according to the secure directed web address,
    wherein determining the secure directed web address from the currently accessed web address according to the history of web address access instructions comprises:
        obtaining at least one historical web address access instruction corresponding to the currently accessed web address from the history of web address access instructions, wherein the historical web address access instruction comprises an access web address, whether including a direct, a directed web address, and an access time; and
        determining the secure directed web address from the currently accessed web address according to the at least one historical web address access instruction,
    wherein determining the secure directed web address from the currently accessed web address according to at least one historical web address access instruction comprises:
        performing a statistical analysis on the at least one historical web address access instruction, and computing an occurrence probability of each directed web address in the at least one historical web address access instruction independently; and
        determining the secure directed web address from the currently accessed web address according to the occurrence probability of each directed web address and/or the access time of each directed web address, and
    wherein determining the secure directed web address from the currently accessed web address according to the occurrence probability of each directed web address and/or the access time comprises:
        determining a directed web address as the secure directed web address, if an access interval from a last access time of the directed web address to a current access time is less than a preset time interval, and a number of continuous occurrences of the directed web address is greater than or equal to a preset number.

2. The method according to claim 1, wherein determining the secure directed web address from the currently accessed web address according to the occurrence probability of each directed web address and/or the access time comprises:
    determining whether a directed web address having the occurrence probability greater than a preset probability threshold exists in the at least one historical web address access instruction;
    if a directed web address having the occurrence probability greater than the preset probability threshold exists in the at least one historical web address access instruction, determining the directed web address having the occurrence probability greater than the preset probability threshold as the secure directed web address; and
    if no directed web address having the occurrence probability greater than the preset probability threshold exists in the at least one historical web address access instruction, determining each directed web address in the at least one historical web address access instruction as the secure directed web address.

3. The method according to claim 1, wherein determining the secure directed web address from the currently accessed web address according to the occurrence probability of each directed web address and/or the access time comprises:
    determining a directed web address as the secure directed web address, if an occurrence probability P of the directed web address, an access interval T from a last access time of the directed web address to a current access time, a weight M for the occurrence probability P of the directed web address, a weight N for a ratio of the access interval T to a maximum access interval $T_{max}$, and a secure direct threshold Q satisfy a formula of $$P * M + \left(1 - \frac{T}{T_{max}}\right) * N \geq Q.$$

4. The method according to claim 1, wherein determining whether the target directed web address is hijacked according to the secure directed web address comprises:
    determining that the target directed web address is not hijacked, if the target directed web address matches the secure directed web address; and
    determining that the target directed web address is hijacked, if the target directed web address does not match the secure directed web address.

5. The method according to claim 1, further comprising:
    executing an operation for blocking directing to the target directed web address, if it is determined that the target directed web address is hijacked.

6. The method according to claim 1, further comprising:
    recording web address access instructions according to access times of access web addresses in the web address access instructions;
    ranking the recorded web address access instructions in an ascending order of access time; and
    determining the history of web address access instructions by choosing a preset number of web address access instructions from the ranked web address access instructions, in which each chosen web address access instruction has the access time before the current access time, or in which an access interval from the access time of the access web address in each chosen web address access instruction to the current access time is less than or equal to a preset time period.

7. A device for detecting web address hijacking, comprising:
    a processor; and
    a memory configured to store instructions executable by the processor,
    wherein the processor is configured to:
        obtain a currently accessed web address and a target directed web address from a current web address access instruction;

determine a secure directed web address from the currently accessed web address according to a history of web address access instructions; and determine whether the target directed web address is hijacked according to the secure directed web address, wherein the processor is further configured to:

obtain at least one historical web address access instruction corresponding to the currently accessed web address from the history of web address access instructions, wherein the historical web address access instruction comprises an access web address, whether including a direct, a directed web address, and an access time; and determine the secure directed web address from the currently accessed web address according to the at least one historical web address access instruction, and wherein the processor is further configured to:

perform a statistical analysis on the at least one historical web address access instruction, and compute an occurrence probability of each directed web address in the at least one historical web address access instruction independently; and determine the secure directed web address from the currently accessed web address according to the occurrence probability of each directed web address and/or the access time of each directed web address, and wherein the processor is further configured to:

determine a directed web address as the secure directed web address, if an access interval from a last access time of the directed web address to a current access time is less than a preset time interval, and a number of continuous occurrences of the directed web address is greater than or equal to a preset number.

8. The device according to claim 7, wherein the processor is further configured to:

determine whether a directed web address having the occurrence probability greater than a preset probability threshold exists in the at least one historical web address access instruction;

if a directed web address having the occurrence probability greater than the preset probability threshold exists in the at least one historical web address access instruction, determine the directed web address having the occurrence probability greater than the preset probability threshold as the secure directed web address; and if no directed web address having the occurrence probability greater than the preset probability threshold exists in the at least one historical web address access instruction, determine each directed web address in the at least one historical web address access instruction as the secure directed web address.

9. The device according to claim 7, wherein the processor is further configured to:

determine a directed web address as the secure directed web address, if a occurrence probability P of the directed web address, an access interval T from a last access time of the directed web address to a current access time, a weight M for the occurrence probability P of the directed web address, a weight N for a ratio of the access interval T to a maximum access interval $T_{max}$, and a secure direct threshold Q satisfy a formula of $$P*M + \left(1 - \frac{T}{T_{max}}\right)*N \geq Q.$$

10. The device according to claim 7, wherein the processor is further configured to:

determine that the target directed web address is not hijacked, if the target directed web address matches the secure directed web address; and determine that the target directed web address is hijacked, if the target directed web address does not match the secure directed web address.

11. The device according to claim 7, wherein the processor is further configured to:

execute an operation for blocking directing to the target directed web address, if it is determined that the target directed web address is hijacked.

12. The device according to claim 7, wherein the processor is further configured to:

record web address access instructions according to access times of access web addresses in the web address access instructions;

rank the recorded web address access instructions in an ascending order of access time; and determine the history of web address access instruction by choosing a preset number of web address access instructions from the ranked web address access instructions, in which each chosen web address access instruction has the access time before the current access time, or in which an access interval from the access time of each chosen web address access instruction to the current access time is less than or equal to a preset time period.

* * * * *